(12) United States Patent
Mori et al.

(10) Patent No.: US 7,088,390 B2
(45) Date of Patent: Aug. 8, 2006

(54) IMAGING APPARATUS IN WHICH EXPOSURE CONTROL IS PERFORMED TO SUPPRESS CHANGES IN SENSITIVITY DUE TO CHANGES IN GRADATION MODE

(75) Inventors: Keiichi Mori, Hachioji (JP); Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 690 days.

(21) Appl. No.: 09/883,833

(22) Filed: Jun. 18, 2001

(65) Prior Publication Data

US 2002/0036697 A1    Mar. 28, 2002

(30) Foreign Application Priority Data

Jun. 19, 2000   (JP)   ............... 2000-183310
Jun. 22, 2000   (JP)   ............... 2000-188030
Jun. 22, 2000   (JP)   ............... 2000-188031

(51) Int. Cl.
*H04N 5/202*   (2006.01)
(52) U.S. Cl. .................................... 348/254
(58) Field of Classification Search ............ 348/222.1, 348/254–256, 671, 673, 674, 677
See application file for complete search history.

(56) References Cited

U.S. PATENT DOCUMENTS 6,141,047 A * 10/2000 Kawai et al. ............... 348/254
6,583,820 B1 * 6/2003 Hung ......................... 348/362

FOREIGN PATENT DOCUMENTS

| JP | 6-169427 A | 6/1994 |
| JP | 7-288738 A | 10/1995 |
| JP | 8-107519 A | 4/1996 |
| JP | 11-75100 A | 3/1999 |
| JP | 2935116 | 6/1999 |
| JP | 11-196292 A | 7/1999 |
| JP | 2000-138862 A | 5/2000 |
| JP | 2000138862 A * | 5/2000 |

OTHER PUBLICATIONS

Hideaki Yoshida, "A Suggestion for Presentation of Sensitivity (speed rating) of a Digital Camera", ITE Technical Report, vol. 20, No. 58, published Nov. 15, 1996 (Japan), pp. 85-90.

* cited by examiner

*Primary Examiner*—Ngoc-Yen Vu
*Assistant Examiner*—Timothy J. Henn
(74) *Attorney, Agent, or Firm*—Frishauf, Holtz, Goodman & Chick, P.C.

(57) ABSTRACT

A digital camera which can change gradation properties comprises a CCD image pickup element 105 for photographing a subject, an exposure control mechanism 103 for controlling an exposure on the image pickup element 105, a digital processing circuit 108 including a gradation converting circuit for being capable of generating image signals having different gradation properties (gamma properties) based on the output signal from the image pickup element 105, and a system controller 112 including a selecting circuit for selecting one of the different gradation properties, which is used in the gradation converting circuit. In the digital camera, to suppress the change of a sensitivity (output level) due to the a change of the gradation property, the exposure control mechanism 103 changes a control target value to control the exposure in accordance with the selected gamma value so that the output level is maintained at constant in the average exposure.

10 Claims, 4 Drawing Sheets

IMAGING APPARATUS IN WHICH EXPOSURE CONTROL IS PERFORMED TO SUPPRESS CHANGES IN SENSITIVITY DUE TO CHANGES IN GRADATION MODE

CROSS-REFERENCE TO RELATED APPLICATIONS

This application is based upon and claims the benefit of priority from the prior Japanese Patent Applications No. 2000-183310, filed Jun. 19, 2000, No. 2000-188030, filed Jun. 22, 2000, and No. 2000-188031, filed Jun. 22, 2000, the entire contents of which are incorporated herein by reference.

BACKGROUND OF THE INVENTION

1. Field of the Invention

The present invention relates to an imaging apparatus in which a gradation (gamma: $\gamma$) property (gradation property curve) can be changed, and particularly to an imaging apparatus in which the gradation property can be changed and exposure control is improved.

Moreover, the present invention relates to an imaging apparatus in which an image pickup device such as CCD is incorporated, and particularly to an imaging apparatus in which sensitivity is enhanced by addition of pixels.

2. Description of the Related Art

In recent years, an imaging apparatus has intensively been developed in which a still picture or an image of a photographic subject is taken by an image pickup device such as CCD and converted to an image signal. In such known imaging apparatus, a gradation property (output signal level property corresponding to photographic subject luminance) can be changed. Concretely, for example, in a broadcasting TV camera or a so-called industrial camera (ITV), the gradation property is set to one of a standard set mode ($\gamma=0.45$) and a linear property set mode ($\gamma=1$) by so-called "gamma change".

Here, a $\gamma$ (gamma) value is an index. Dissociation from a linear input/output property is noted as well known, and a relation between input x and output y is approximately represented by an equation $y=a \times x\gamma+b$ (a, b are constants). Therefore, when $\gamma=1$, the input and output are in a proportional relation. Additionally, since b corresponds to a pedestal or an offset, it is often taken into consideration independently of the $\gamma$ value.

A value $\gamma=0.45$ is a standard system value in broadcasting, and selected as a value for obtaining a general high quality (visually satisfactory image quality for a purpose of appreciation) in consideration of the gradation property of a reproduction system. On the other hand, $\gamma=1$ is selected as a value for removing an error factor attributed to a gradation conversion circuit for a purpose of measurement or in camera adjustment.

An automatic exposure control is often used for the camera described above. Generally, a control object of the automatic control is an output from the image pickup device, that is, a linear signal before inputted to the gradation conversion circuit usually called "$\gamma$ conversion circuit". According to the control method, optimum exposure control directly corresponding to a dynamic range of the image pickup device can be realized.

In recent years, an electronic still camera which is one type of the electronic imaging apparatus described above and which is capable of recording a still picture has come into wide use in the name of a "digital camera", and there has been a need for a change of the gradation property in a meaning different from that of a broadcasting TV camera or an industrial camera. That is, there has been a demand for a digital camera in which an optimum gradation can selectively be set in accordance with user's taste or scene situation in order to obtain a high-quality picture comparable to a picture on a silver-halide or silver-salt film.

On the other hand, for the digital camera intended to take the picture corresponding to the silver-halide picture, a natural requirement is that a person skillful in taking the silver-halide picture can satisfactorily use the digital camera. Therefore, specifications and operability (so-called handiness) equivalent to those of the silver-halide picture are required in background. To this end, for example, an attempt to indicate "sensitivity" of the digital camera in so-called "ISO indication" similarly as a conventional silver-halide film has been carried out.

One attempt is described in "Television Society Technical Report/Yoshida: Study on Digital Camera Sensitivity (Speed) Indicating Method: ITE Technical Report Vol. 20, No. 58, PP. 85 to 90, CE'96-25 (November, 1996)". In a measuring method used in the sensitivity indicating method, the sensitivity is defined with "an exposure amount which gives a predetermined value (proposed value 106.5/255) defined in an intermediate range (satisfactory gradation reproduction range) of a digital value recorded by the digital camera". With the camera having the same "sensitivity" obtained by the measuring method, the same digital signal output is obtained during photography with the predetermined exposure amount for a measurement reference.

Additionally, another discussion is necessary for judging whether this proposal can be said to correspond to the so-called "ISO indication". However, the "sensitivity" itself proposed in the document is "an index indicating the exposure amount necessary for obtaining an image with the same brightness (output level)", and is therefore significant. Moreover, in the following description, the "sensitivity" indicates such sensitivity as described in the document (the predetermined value is indefinite) unless otherwise specified.

When the gradation property is changed in accordance with the user's taste and scene situation and the gradation is selected as described above, even with a constant gain of an imaging system, the sensitivity changes with the gradation property change. Therefore, a problem is that the obtained output level changes.

This respect will be described in more detail. Since the gradation property is changed, it is originally impossible to obtain an equal output level over a whole luminance distribution of the photographic subject. However, considering from an average or typical portion of the luminance distribution of the photographic subject, in other words, considering only from a main photographic subject, it is preferable that the output level for the subject should not change even with the changed gradation property. Additionally, in the conventional digital camera, since these are not considered, the output level disadvantageously changes largely as described above.

Moreover, concerning sensitivity enhancement, even when the imaging apparatus is a dynamic imaging apparatus or a still imaging apparatus, adjacent pixel information of the image pickup device is added, for example, signals of four pixels in total of two pixels in a vertical direction and two pixels in a horizontal direction are added, then resolution is deteriorated, but the sensitivity can be enhanced.

Known examples of an adding method include an outer digital adding system, device inside analog adding system, and the like. The outer digital adding system comprises: reading a pixel signal from the image pickup device for each pixel in a usual method, subsequently subjecting the signal to A/D conversion, and adding the pixel signals in a digital system. On the other hand, in the device inside analog adding system, transfer drive of a CCD image pickup device is devised in the image pickup device, and charges are added in a transfer path. As a result of comparison of the systems, the analog adding system is superior in that a frame rate can also be enhanced.

Additionally, when this technique is actually applied to the electronic camera, the sensitivity can be enhanced, but a noise increases with the sensitivity enhancement. Beyond simple resolution deterioration because of a decrease of the number of pixels, image quality deterioration further occurs.

In this respect, for example, it is also described in the conventional publication that fourfold-sensitivity can be obtained in addition of four pixels. However, this cannot be said to be correct in consideration about the noise. Because it is known that noise improvement effect in the pixel addition, that is, SN enhancement is proportional to a square root of an added number of the pixels in respect to a statistic property of random noise. In the addition of four pixels, only double SN (i.e., 6 dB) can be expected. Therefore, during imaging while the image quality, that is, the noise level is kept, the imaging with double sensitivity, that is, ½ of the standard exposure amount is a limitation. Supposing that the image is taken with a ¼ exposure amount and four pixels are added in order to obtain the fourfold-sensitivity, a signal component S is ¼×4=once, noise N is 1×√4=twice, and SN is deteriorated by 6 dB.

Then, addition of four pixels and exposure with the ½ exposure amount are considered. In an analog adding system in the digital camera, there is a problem of saturation in an A/D converter. That is, if a maximum output level of a horizontal transfer path or an image pickup device output amplifier as a position for executing the addition is not limited, it is necessary to handle a charge amount for ½×4=2 pixels, that is, double output voltage in the addition of four pixels with the ½ exposure amount. Therefore, when the conventional usual A/D converter corresponding to the voltage for one pixel device is used as it is, an A/D input voltage exceeds A/D quantized maximum voltage, and the signal is clipped.

In this case, in order to prevent the clip during the quantization in the A/D converter, it is necessary to set a maximum quantization level (Dmax) of A/D to be twice the conventional level. With this setting, the problem of saturation can securely be avoided. However, in a usual non-addition time, the maximum value of CCD output signal is Dmax/2, and a larger digital bit is wasted. In other words, a relative quantized error disadvantageously becomes double from an ideal state.

Additionally, to avoid the problem, the A/D converter quantized error itself may be reduced. In other words, the A/D converter with a larger number of bits than an originally necessary number of bits is necessary, and cost increase is unfavorably caused.

In the conventional art, the addition of pixels is carried out in this manner in order to enhance the sensitivity of the imaging apparatus. However, in the analog adding system, since the A/D input voltage exceeds the A/D quantized maximum voltage, the signal is clipped. There is a problem that the image quality is deteriorated.

BRIEF SUMMARY OF THE INVENTION

An object of the present invention is to provide an imaging apparatus which can hold sensitivity and output level to be constant even when a gradation property is changed.

Moreover, another object of the present invention is to provide an imaging apparatus in which imaging with an enhanced sensitivity can be carried out by addition of pixel information in an analog adding system, and an image quality can be prevented from being deteriorated by clip in an A/D converter.

According to the present invention, there is provided an imaging apparatus for photographing a photographic subject, comprising:

an image pickup device in which light is received from the photographic subject, a photographic subject image is formed, and the image is converted to an original image signal;

designating means for designating one of a first gradation mode and a second gradation mode;

converting means for converting the original image signal from the image pickup device to an output image signal in accordance with the designation of one mode by the designating means, the output image signal having a first gradation in the designation of the first gradation mode, and a second gradation in the designation of the second gradation mode; and adjusting means for adjusting a level of the original image signal inputted to the converting means in accordance with the designation of one mode by the designating means, and keeping an average level of the output image signal outputted from the converting means at a substantially constant level even in the designation of the first and second gradation modes.

Moreover, according to the present invention, there is provided an imaging apparatus for photographing a photographic subject, comprising:

an image pickup device for receiving light rays transferred from the subject, a photographic subject image being formed on the image pickup device, and the image being converted to an original image signal;

designating means for designating one of first and second gradation modes;

converting means for converting the original image signal from the image pickup device to an output image signal in accordance with the designated mode, the output image signal having a first gradation in accordance with a first gradation curve in the designation of the first gradation mode, and a second gradation in accordance with a second gradation curve in the designation of the second gradation mode; and adjusting means for adjusting a level of the original image signal inputted to the converting means in accordance with the designated mode, and maintaining an average level of the output image signal outputted from the converting means at a substantially constant level;

wherein the first and second gradation property curves intersect each other at a certain target value, and the target value substantially corresponds to the average output level of the output image signal.

Furthermore, according to the present invention, there is provided an imaging method of photographing a subject, comprising:

an image pickup step of receiving light rays transmitted from the photographic subject, a photographic subject image being formed, and the image being converted to an original image signal;

designating step of designating one of a first gradation mode and a second gradation mode;

converting step of converting the original image signal to an output image signal in accordance with the designated mode, the output image signal having a first gradation in the designation of the first gradation mode, and a second gradation in the designation of the second gradation mode; and adjusting step of adjusting a level of the original image signal in the converting step in accordance with the designated mode, and maintaining an average level of the output image signal in the converting step at a substantially constant level even in the designation of the first and second gradation modes.

Yet further, according to the present invention, there is provided an imaging method for photographing a photographic subject, comprising:

an imaging step of receiving light rays from the photographic subject, forming a photographic subject image, and converting the image to an original image signal;

a designating step of designating one of a first gradation mode and a second gradation mode;

a converting step of converting the original image signal to an output image signal in accordance with the designation of one mode in the designating step, the output image signal having a first gradation in accordance with a first gradation curve in the designation of the first gradation mode, and a second gradation in accordance with a third gradation curve in the designation of the second gradation mode; and an adjusting step of adjusting a level of the original image signal inputted to the converting step in accordance with the designation of one mode by the designating step, and maintaining an average level of the output image signal outputted from the converting step at a substantially constant level;

wherein the first and second gradation property curves intersect each other at a certain target value, and the target value substantially corresponds to the average output level of the output image signal.

Yet furthermore, according to the present invention, there is provided an imaging method for photographing a photographic subject, comprising:

an imaging step of receiving light rays from the photographic subject, forming a photographic subject image, and converting the image to an original image signal;

a designating step of designating one of a first, second and third gradation modes; and a converting step of converting the original image signal to an output image signal in accordance with the designation of one mode in the designating step, the output image signal having a first gradation in accordance with a first gradation curve in the designation of the first gradation mode, a second gradation in accordance with a second gradation curve in the designation of the second gradation mode, and a third gradation in accordance with a third gradation curve in the designation of the third gradation mode;

wherein the first, second and third gradation property curves intersect one another at a substantially same point.

As described above, in some of the cameras in which a plurality of gradation properties (gamma) can be changed, when exposure control of a predetermined target value is carried out in a linear system (on a gamma input side), sensitivity (output signal level) changes by the gamma change.

To solve the problem, in the imaging apparatus having a plurality of gamma properties, exposure control is carried out in such a manner the output level for average exposure becomes the same even with the gamma change. Concretely, the exposure is controlled and a plurality of control target values are changed in accordance with the gamma change on a gamma input side. Alternatively, the exposure is controlled and the same control target value is used on a gamma output side. Thereby, even when the gamma is changed, the output level does not change with respect to average exposure. That is, even when the gradation property is changed, the output level can be kept to be constant.

According to the present invention, there is also provided an imaging apparatus for photographing a photographic subject, comprising:

an image pickup device for receiving light rays transferred from the subject, a photographic subject image being formed on the image pickup device, and the image being converted to an original image signal;

designating means for designating one of first, second and third gradation modes; and converting means for converting the original image signal from the image pickup device to an output image signal in accordance with the designated mode, the output image signal having a first gradation in accordance with a first gradation curve in the designation of the first gradation mode, a second gradation in accordance with a second gradation curve in the designation of the second gradation mode, and a third gradation in accordance with a third gradation curve in the designation of the third gradation mode;

wherein the first, second and third gradation property curves intersect one another at a substantially same point.

Here, preferred embodiments of the present invention are as follows.

(1) The intersection of the property curves is set to correspond to 18 to 20% of a maximum signal level in a value on an input side of the gradation converting property.

(2) At least one of the gradation converting properties is constituted to have a knee property in which a knee point is set in a region with a signal value larger than that of the intersection of the property curves.

As described above, the camera which can change a plurality of gradation properties (gamma) is known. However, when the exposure control is performed at the predetermined target value in the linear system (gamma input side), the sensitivity (output signal level) changes by the gamma change.

To solve the problem, according to the present invention, in an imaging apparatus having a plurality of gamma properties, the exposure control target value (recommended average exposure level) is the same on the gamma input side, and a plurality of gamma curves cross one another at the point. When there are three or more properties, all the properties have a common cross point. In this constitution, even when the gamma property is changed, the output level in the cross point is the same. Even when the gradation property is changed in the vicinity of the cross point, sensitivity and output level can be kept to be constant.

Moreover, the cross point is a point corresponding to 18 to 20% ($\pm\frac{1}{3}$ EV) of an input full scale. This value is in the vicinity of a logarithmic midpoint of a photographic subject range, and an region with a maximum possibility of correspondence to a main photographic subject is in the vicinity of the logarithmic midpoint of the photographic subject range. Therefore, the value can be the to be a best selection. Furthermore, the knee property is disposed so that the range is ensured with the intersecting of the properties. Thereby, a photographic subject reproduction range can be prevented from being narrowed with a large gamma.

According to the present invention, there is provided an imaging apparatus, comprising: image pickup device including a plurality of pixel elements arranged in a matrix arrays and a charge transfer path of interline type, a image of the subject being formed on the image pickup device and change being generated in the pixel elements; driving means for driving the image pickup device to readout the pixels as a image signal from the image pickup device, the driving means setting a addition mode in which the pixels are added and the added pixels are readout as the image signal; analogue to digital converter for quantizing the image signal to output a quantized image signal; and quantizing level setting means for setting a maximum quantizing level in the analogue to digital converter, which is changed in accordance with the addition number of the pixels.

Here, preferred embodiments of the present invention are as follows.

(1) The constitution comprises exposure control means for controlling an exposure amount with respect to the image pickup device, and the quantized level setting means variably sets the quantized maximum level in accordance with the added number of adding/reading, and the exposure amount target value set by the exposure control means.

(2) The interline type charge transfer path comprises a plurality of vertical transfer paths disposed adjacent to the pixels arranged in a matrix in a column direction, and a horizontal transfer path disposed adjacent to an end of these vertical transfer paths in a row direction. The driving means adds the signals corresponding to the pixels adjacent in the vertical direction in the horizontal transfer path, and adds the signals corresponding to the pixels adjacent in the horizontal direction in an output amplifier connected to an output end of the horizontal transfer path.

(3) The number of pixels added by the driving means is the same in the horizontal and vertical directions.

(4) The image pickup device is a CCD image pickup device.

According to the present invention, the quantized level setting means variably sets the quantized maximum level in the A/D converting means in accordance with the added number of adding/reading by the driving means. Thereby, a phenomenon in which the A/D input voltage exceeds the A/D quantized maximum voltage with the signal addition can be suppressed. Therefore, the added signal can be prevented beforehand from being clipped by the A/D converting means. Therefore, photography with enhanced sensitivity is enabled by addition of the pixel information of the analog adding system without deteriorating the image quality by the clip in the A/D converting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A detail of a digital camera according to an embodiment of the present invention will be described hereinafter with reference to the drawings.

Figure 1:
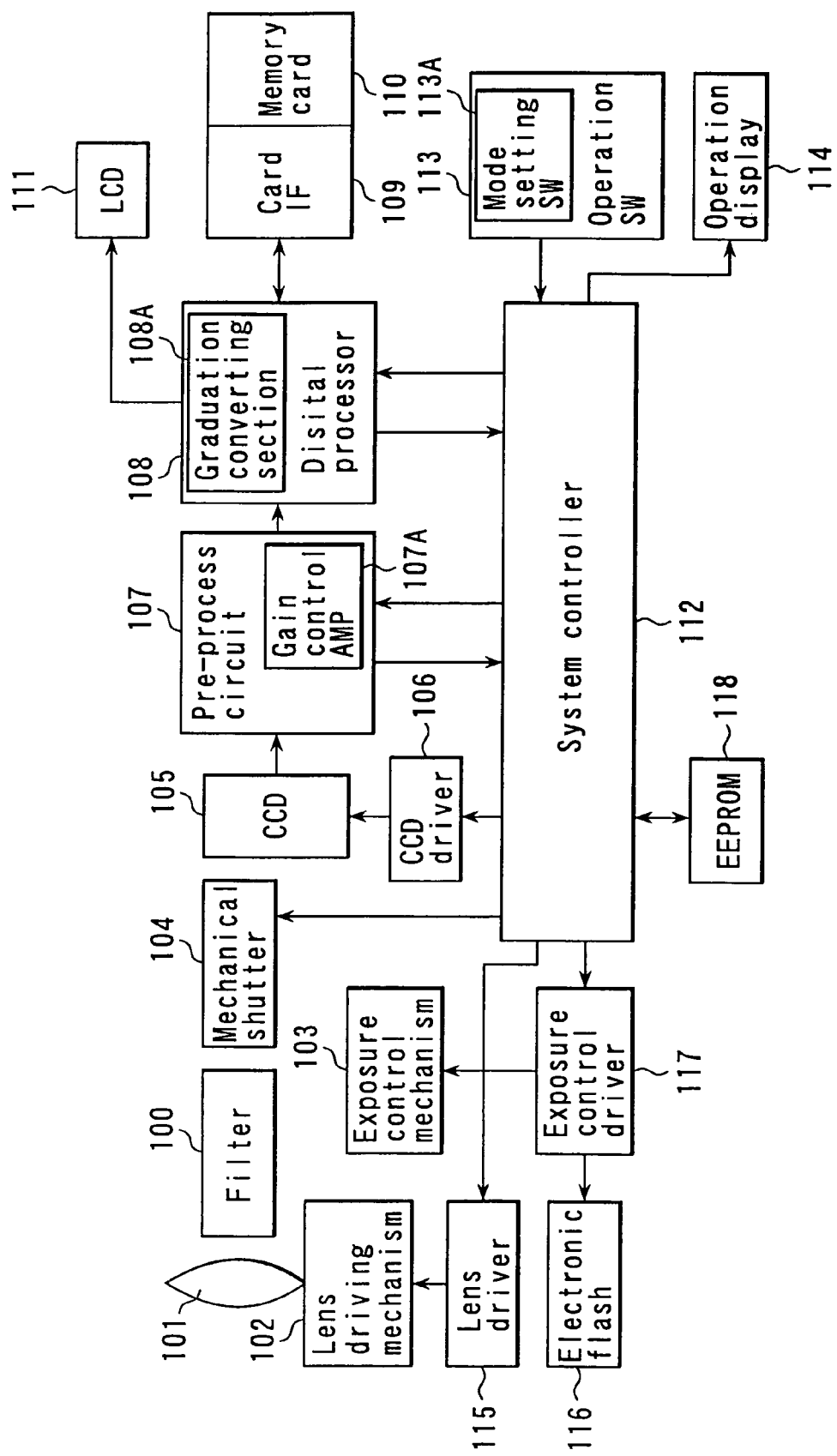
FIG. 1 is a block diagram schematically showing a circuit of a digital camera according to one embodiment of the present invention.

FIG. 1 is a block diagram showing a circuit configuration of the digital camera according to one embodiment of the present invention. In FIG. 1, reference numeral 101 denotes a photography lens system constituted of various lenses for photographing a photographic subject, 102 denotes a lens driving mechanism for driving the lens system 101 in accordance with the photographic subject, and the lens driving mechanism 102 drives the photography lens system 101 to focus the photography lens system 101 on the photographic subject. Light rays reflected from the photographic subject are directed to CCD unit 105 via the lens system 101 and a stop included in an exposure control mechanism 103. In the exposure control mechanism 103, the stop is adjusted, the light rays passed through the stop is controlled and an exposure amount is controlled. The light transmitted through the stop is transmitted through a filter system 100 including a low pass filter and infrared cutting filter and a mechanical shutter 104, and is incident upon the CCD color pickup unit 105. A photographic subject image is formed on imaging arrays of the CCD color pickup unit 105. The pickup unit 105 is driven by a CCD driver 106, and the photographic subject image on the imaging array is converted to an image signal. The image signal is processed in a preprocessing circuit 107 which includes a gain control amplifier 107A which can change an amplification factor, i.e., a gain of the image signal and an A/D converter for converting the amplified image signal to a digital image signal. The digital image signal is processed by a digital processing circuit 108 for performing various digital constitutions such as a color signal generation processing and matrix conversion processing, and stored in a memory card 110 such as CF via a card interface 109. Moreover, the image is displayed in an LCD image display system 111 based on the image signal from the digital processing circuit 108.

Moreover, reference numeral 112 in FIG. 1 denotes a system controller (CPU) for generally controlling respective components shown in FIG. 1. Numeral 113 denotes an operation switch system constituted of various switches including a mode setting SW 113A for setting gradation (gamma) property, i.e., actually setting a standard mode, a soft mode or a hard mode. Numeral 114 denotes an operation display system for displaying a digital camera operation state, mode state, and the like, and 115 denotes a lens driver for controlling the lens driving mechanism 102. Numeral 116 denotes a strobe which emits photography light rays during photography, 117 denotes an exposure control driver for controlling the exposure control mechanism 103 and strobe 116, and 118 denotes a nonvolatile memory (EE-PROM) for storing various setting information, and the like.

In the digital camera of the present embodiment, the system controller 112 generally controls the respective components. Particularly, the system controller 112 controls the driving of the CCD color pickup unit 105 by the exposure control mechanism 103 and CCD driver 106 to control exposure (charge accumulation). The system controller 112 similarly controls the reading of the image signal from the CCD color pickup unit 105, and the digital processing circuit 108 takes the image signal via the preprocessing circuit 107. Furthermore, under the control of the system controller 112, the image signal is subjected to various signal processings and subsequently recorded in the memory card 110 via the card interface 109. Additionally, examples of the CCD color pickup unit 105 include an interline progressive (successive) scanning unit with a vertical overflow drain structure.

Moreover, the digital processing circuit 108 shown in FIG. 1 includes a gradation converter 108A which can generate image signals having different gradation properties with respect to the same image signal. When the mode setting SW 113A in the operation switches 113 sets the gradation property ($\gamma$ property), i.e., one of the standard, soft and hard modes, a gradation designation signal of the set mode is supplied to the system controller 112. Then, the system controller 112 designates the gradation to be converted, that is, $\gamma$ value with respect to the gradation converter 108A of the digital processing circuit 108. Moreover, with the designation of the gradation by the system controller 112, similarly the gain control amplifier 107A of the preprocessing circuit 107 sets the gain in accordance with the designated gradation in response to a command of the system controller 112. Furthermore, the system controller 112 transmits information of the designated gradation to the exposure control driver 117, and the exposure control driver 117 controls exposure in accordance with the selected gradation property.

Figure 2:
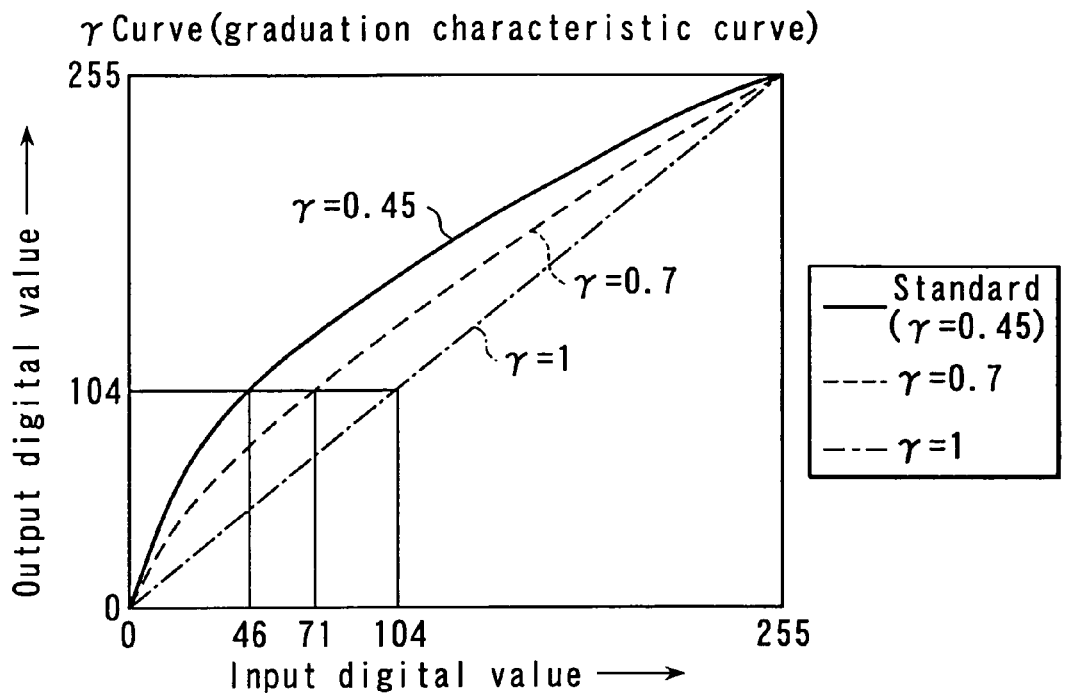
FIG. 2 is a graph of a gradation property curve utilized in a gradation converter shown in FIG. 1, showing a relation between a gradation property and an exposure target value.

FIG. 2 is a graph of a gradation property and exposure target value which can be controlled in the digital camera shown in FIG. 1. To simplify description, in the graph of FIG. 2, eight bit data is assumed for input and output digital values. In FIG. 2, a solid line is a graph showing a property of a gradation ($\gamma$=0.45) of the standard mode, a broken line is a graph showing the gradation property in a mode of $\gamma$=0.7, and a dashed line is a graph showing the property of the gradation in a mode of $\gamma$=1 (the output digital value is in a linear relation with respect to the input digital value). Additionally, in the digital camera shown in FIG. 1, the mode setting switch 113A can change the mode to other two modes ($\gamma$=0.7 and $\gamma$=1) from default "standard", and even the $\gamma$ value can be selected in the modes.

The standard mode ($\gamma$=0.45) is actually a recommended property of JEIDA DCF specification as a digital camera standard specification: $\gamma=1.099 \times x^{0.45}-0.099$. (Additionally, x=input/255, y=output/255, this equation is applied to $x \geq 0.018$, and $y=4.5 \times x$ is applied in $x<0.018$.) Moreover, $\gamma$=0.7 corresponds to property of $y=x^{0.7}$, and $\gamma$=1 corresponds to property of $y=x$.

In the camera shown in FIG. 1, a brightness or luminous of the photographic subject is measured in center selective average photometry, and exposure is controlled by calculation or feedback control so that a photometric value (signal level average value) is equal to an exposure target value. Therefore, an output value obtained from a flat photographic subject (with no pattern) corresponds to the exposure control target value. When the main photographic subject in a usual exposure condition is assumed, the flat photographic subject can be represented or substituted as well known.

Luminance information about the photographic subject taken by the digital processing circuit 108 is analyzed or calculated by the system controller 112 so that the photographic subject luminance is measured. The system controller 112 drives the exposure control mechanism 103 or the strobe 116 via the exposure control driver 117 based on an analysis result so that the exposure is controlled. When a device shutter function is used as the shutter, the CCD driver 106 can control/drive CCD to realize the function.

As shown in FIG. 2, an exposure control point 46 in the standard ($\gamma$=0.45) corresponds to 18% of a maximum input digital value 255. The input digital value 46 substantially corresponds to a logarithmic midpoint of an input range in the standard $\gamma$. When an ideal de-gamma (a total linear value) is assumed in the reproduction system, the input digital value 46 actually corresponds to the logarithmic midpoint of a display range of a reproduction system. From FIG. 2, an output digital value 104 corresponds to the input digital value 46.

Additionally, for the gradation property, generally during photographing of the main photographic subject, a region having a highest possibility of correspondence to the photographic subject luminance is in the vicinity of the logarithmic midpoint of the photographic subject range. The region numerically corresponds to 18% as the logarithmic midpoint between white and black levels. Here, it is assumed that the white level is a reflectance of about 98% of the photographic subject having a highest diffusion reflectance and that the black level is a reflectance of about 3.3% of the photographic subject having a lowest diffusion reflectance. Based on this finding, 18% has been used as the numeric value of a standard reflectance representing the photographic subject or a reflectance of a standard reflector for evaluation in a photographic technical field.

Additionally, according to the present inventor's study, in the actual photography, when a numeric value 4% of the lowest reflectance is assumed and a logarithmic midpoint value 20% is used, a good result is produced in many cases. In this meaning, an exposure control point value of about 18 to 20% can be set as a target value (aimed value) for obtaining the best result.

Here, the photographic subject range has been considered in the above. However, when ideal gamma conversion (i.e., total linear) for the imaging/display system is assumed, the above indicates a similar meaning even in a final light output gradation (display range) in an "output apparatus (display apparatus)". In actual, for a visual property of observation of an output image, the "logarithmic midpoint" is preferable on the assumption of a logarithmic recognition property for a stimulus strength governed by Weber's law or Fechner's law.

In this meaning, for the exposure control target value, the value (18 to 20% as described above) on a conversion input side (photographic subject proportional signal) in a standard gradation converting property (total linear property is assumed) should be a standard. However, when the property is changed to an arbitrary converting property, the corresponding value on a conversion output side (post-gamma signal) in the standard property is rather preferably used as the standard.

Moreover, in the real camera, there are various error factors, and there is a certain degree of freedom of a tolerance limit in product evaluation. Therefore, set values substantially in a range of ±⅓ EV with respect to the aforementioned set target value (i.e., 18%−⅓ EV=14.3% or more, 20%+⅓ EV=25.2% or less) are included in a numeric value limited range of the present invention. Additionally, ±⅓ EV is a numeric value frequently used as a standard tolerance error range in the technical field, for example, in standards such as JIS and ISO. Additionally, to describe that by way of precaution, it is apparent that with an error of ±0.1 EV or less, the value can be regarded as the same without any condition in almost all cases of the field.

By the aforementioned control, the main photographic subject (the photographic subject represented by the photometric value) can be reproduced as an image whose luminance is distributed in substantially the same output luminance range as that of the photography in the standard gradation property, that is, in the vicinity of the logarithmic midpoint of the display range in the output apparatus (display apparatus).

Moreover, when the mode is changed, the exposure control target value is changed to respective values 71, 104 in accordance with the changed mode. That is, for a target value s with $\gamma=0.7$, 71 is obtained as a solution of $(105/255)=(s/255)^{0.7}$. With $\gamma=1$, since y=x, an output corresponding value is still 104. In this case, the exposure control target value does not correspond to the logarithmic midpoint of the input range, but the output level of the main photographic subject (the photographic subject represented by the photometric value) does not change.

As described above, according to the present invention, a plurality of control target values for the gamma value (the gamma output value is the same) are preset, exposure is controlled on the gamma input side in accordance with the gamma value during change of the gamma property, and a plurality of control target values are changed. Thereby, the average level of the image signal can be kept to be substantially constant. Therefore, the exposure can be controlled so that the output level is the same for average exposure even with the changed gamma, and usefulness of the control is remarkably high.

The change of the γ property will be described in further detail with reference to FIGS. 3 and 4. In the descriptions below, the amplified value of the gain control amplifier 107A is assumed to be a fixed value, unless otherwise stated.

Figure 3:
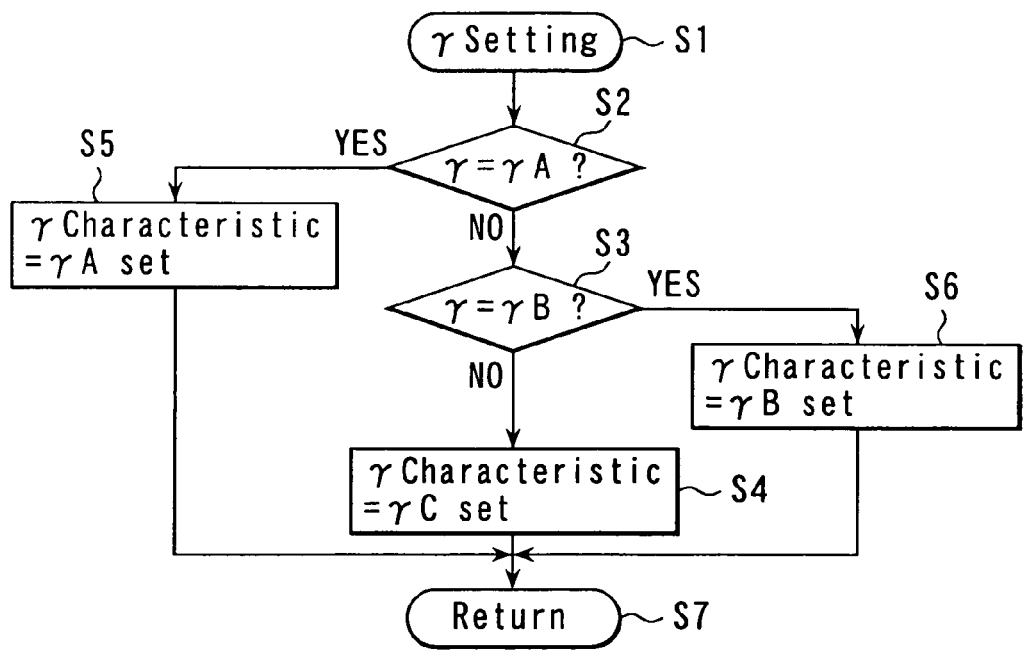
FIG. 3 is a flowchart showing a setting procedure in which a γ value in the digital camera shown in FIG. 1 is selectively set.
Figure 4:
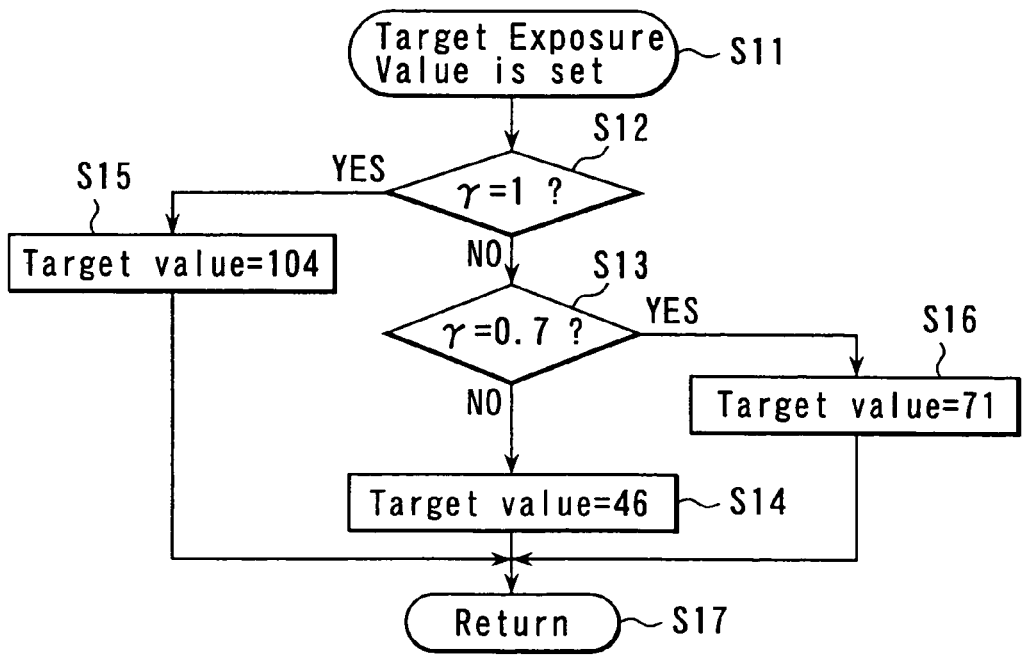
FIG. 4 is a flowchart showing an exposure target setting procedure in which the γ value in the digital camera shown in FIG. 1 is selectively set.

FIGS. 3 and 4 are flowcharts illustrating the setting control of the γ property, which is executed prior to actual imaging. The flowcharts also illustrate the setting control of a corresponding exposure target value. These setting control operations are described as sub-flows which branch off from the main flow (the control flow of the operation of the entire camera) and which are executed as need arises (the sub-flows corresponds to sub-routines of a program).

Let it be assumed that the user designates γ by operating the mode setting switch 113A before the execution of these sub-flows, and that the setting parameter designated then (one of γA, γB and γC) is stored in a memory (not shown). If, intentionally, the user does not designate γ, default setting γC is selected. The default setting in the present camera is standard γ(=0.45) described above with reference to FIG. 2.

The setting of γ is executed in the manner shown in FIG. 3. First, the system controller 112 reads out a γ setting parameter from the memory. When the check in step S2 indicates that $\gamma=\gamma A$, the flow advances to step S5. In this step, the conversion property of the gradation converter 108A of the digital processing circuit 108 is set in accordance with γA. (The conversion property is so determined as to satisfy the equation $\gamma=1$ in FIG. 2.) When the check in step S2 does not indicate that $\gamma=\gamma A$, the flow advances to step S3. If the check in this step S3 indicates that the equation $\gamma=\gamma B$ is satisfied, the flow advances to step S6. In this step, the conversion property of the gradation converter 108A of the digital processing circuit 108 is set in accordance with γB. (The conversion property is so determined as to satisfy the equation $\gamma=0.7$ in FIG. 2.) If the check in step S3 does not indicate that the equation $\gamma=\gamma B$ is satisfied, the flow advances to step S4. In this step S4, the conversion property of the gradation converter 108A of the digital processing circuit 108 is set in accordance with γC. (The conversion property is so determined as to satisfy the equation $\gamma=0.45$ in FIG. 2.) In any case, step S7 is executed to terminate the sub-flow, and predetermined steps of the main flow are executed again.

After the value of γ is determined, the processing for setting the exposure target value shown in FIG. 4 is started. When the check in step S12 determines that $\gamma=1$, the system controller 112 executes step S15, wherein it sets the exposure target value (in input digital values) to "104." When the check in step S12 does not determine that $\gamma=1$, the next step S13 is executed to see if $\gamma=0.7$. If this is the case, step S16 is executed to set the exposure target value (in input digital values) to "71." If step S13 does not determine that $\gamma=0.7$, step S14 is executed to set the exposure target value (in input digital values) to "46." Each of these target values corresponds to the output digital value 104 in the gradation property determined then. In any case, step S17 is executed to terminate the sub-flow, and predetermined steps of the main flow are executed again.

In the embodiment described above, the gain of the gain control amplifier 107A of the preprocessing circuit 107 is kept fixed. It should be noted that the exposure control method is not limited to the method in which the amount of charge in an ordinary type of element is controlled. That is, the gain control amplifier 107A may be employed to vary the circuit gain of the linear system. This variable circuit gain method may be used singly or in combination with the method described above.

When any one of the input digital values 104, 71, 46 is set (as a target value) in the manner described above, the system controller 112 shown in FIG. 1 sets the exposure control driver 117 so that exposure control is carried out using the input digital value set by the exposure control driver 117 as a control target. Moreover, the system controller 112 sets the digital processing circuit 108 so that the gradation converter 108A of the digital processing circuit 108 performs a processing of converting the input digital image signal to the output digital image signal by use of the gradation set by the user with the mode setting switch 113A as described above, that is, γ.

When the photography is started, the exposure control mechanism 103 is controlled in accordance with the set gradation property and the photographic subject is photographed by the CCD 105 with the proper exposure based on the exposure target value. The image signal from the CCD 105 is supplied to the preprocessing circuit 107 and is then subjected to a predetermined γ conversion processing by the gradation converter 108A of the digital processing circuit 108, converted to the image signal such that the digital output value as the target is the center output value, and stored in the memory card 110. Moreover, the signal is supplied to the LCD 111, and displayed in the LCD 111.

As described above, even when the user changes the gradation property by a series of processing and performs the photography in accordance with user's taste, the exposure target value of the input digital value is changed, and an output center point is kept at a constant reference point. In this state, the output corresponding to the photographic subject image having the gradation property according to the user's taste is outputted via the digital processing circuit 108.

The present invention is not limited to the aforementioned embodiment. In the embodiment, the exposure is controlled on the gamma input side. However, it is also possible to fix the target value to 104 and control the exposure on the gamma output side. In this case, control of output property can be simplified. Additionally, an influence of the gamma value sometimes occurs in average calculation of the photographic subject.

Figure 5:
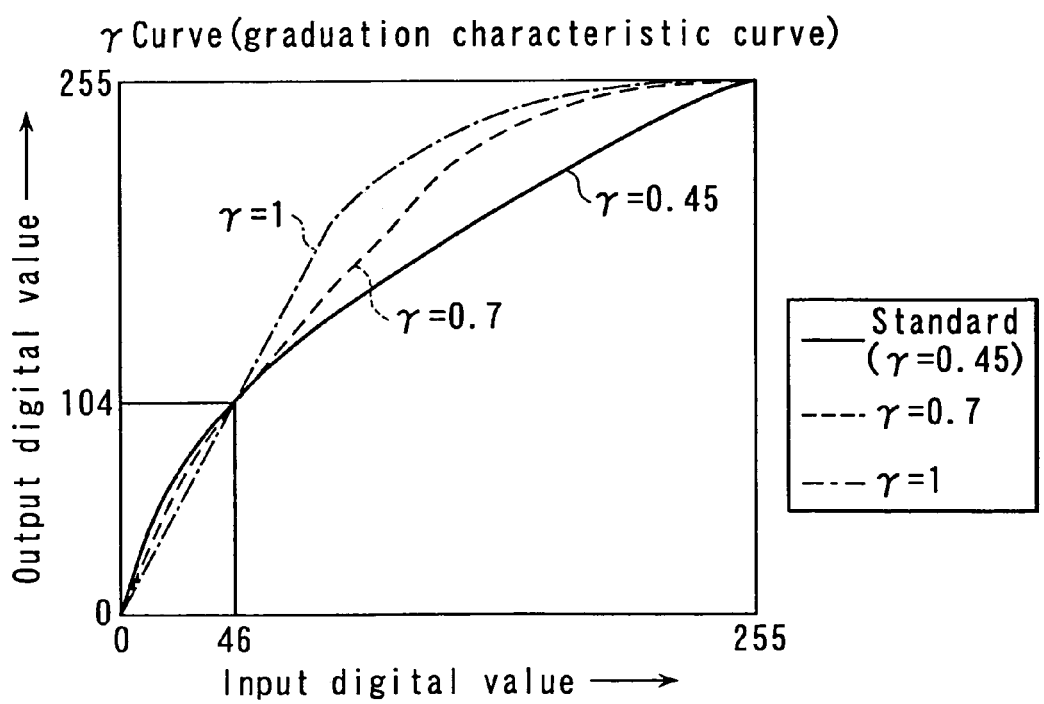
FIG. 5 is a graph of the gradation property curve utilized similarly in the gradation converter shown in FIG. 1, showing the relation between the gradation property and the exposure target value.

FIG. 5 is a graph showing the control system of the gradation property and exposure target value according to another embodiment of the present invention. In FIG. 5, to simplify the description, the eight bit data is assumed for both the input and output digital data. In FIG. 5, a solid line is a graph of a standard gradation ($\gamma$=0.45), a broken line is a graph for $\gamma$=0.7 (with the knee), and a dashed line is a graph for $\gamma$=1 (with the knee). Similarly as the aforementioned embodiment, in the digital camera of the present embodiment, the mode setting switch 113A can change the mode to other two modes ($\gamma$=0.7, $\gamma$=1) from the default "standard".

As described above, the standard $\gamma$=0.45 is actually the recommended property of JEIDA DCF specification as the digital camera standard specification: $y=1.099 \times x^{0.45} - 0.099$. (Additionally, x=input/255, y=output/255, the equation is applied to $x \geq 0.018$, and $y=4.5 \times x$ is applied in $x<0.018$.)

In the present embodiment, the gradation converter 108A shown in FIG. 1 has a property of converting the input image signal to the output image signal with the $\gamma$ converting property shown in FIG. 5. For the $\gamma$ property shown in FIG. 5, each $\gamma$ property graph shown in FIG. 2 is multiplied by a coefficient so that the graphs of $\gamma$=1, 0.7 and 0.45 pass through a certain exposure control point (input digital value 46 and output digital value 104). In other words, the $\gamma$ property graphs shown in FIG. 2 are multiplied by the respective coefficients so that the graphs of $\gamma$=1, 0.7 and 0.45 intersect one another at the certain exposure control point.

$$y=2.2609 \times x$$

$$y=1.3525 \times x^{0.7}$$

When the $\gamma$ graph shown in FIG. 2 is simply multiplied by the coefficient, the photographic subject reproduction range is narrowed. Therefore, for the region y>0.75 (output value digital value of 192 or more) whose signal value is sufficiently larger than that of the vicinity of the intersection corresponding to the main photographic subject gradation region, so-called knee property is disposed. The property has a high contrast with respect to the main photographic subject (i.e., the region in the vicinity of the intersection), but is devised so as to secure the reproduction range by compressing only the high level region.

The exposure is controlled on the input side of the gamma converter 108A, that is, in a circuit portion referred to as so-called linear system, so that the control target value corresponds to the digital value 46 at all times. Even when the mode is changed during this exposure control, the sensitivity does not change, a sensitivity measurement reference point is kept at 104, and the center level of the gradation in the output level of the main photographic subject is not changed.

As in the embodiment described above, the system shown in FIG. 1 performs the exposure control by causing the system controller 112 to set the parameter of the exposure control driver 117. In the meantime, the control target value is kept at a fixed digital value 46 and is not varied when the value of $\gamma$ is switched from one to another. The setting of the value of $\gamma$ is performed in a similar manner to that shown in FIG. 3. It should be noted that the property corresponding to $\gamma$A is "$\gamma$=1" shown in FIG. 5, and the property corresponding to $\gamma$B is "$\gamma$=0.7" shown in the same Figure.

Additionally, the intersections of three property curves completely agree with one another in this example. However, needless to say, with the "substantial agreement", the object can sufficiently be achieved. That is, for example, the intersections of three properties are handled in the above example. When one intersection is generated for the two property curves, three intersections in total are generated. If these three points are sufficiently close to one another, an effect similar to that of the "agreement" can be fulfilled.

Therefore, "a common property curve intersection (the point at which one input value is converted to the same output value irrespective of the selected property)" in the present invention is "common" including the aforementioned case, and naturally means "the same". Moreover, in this case, for judgment of substantial agreement, similarly as the aforementioned embodiment, the range of $\pm\frac{1}{3}$ EV (−20.6%, +26.0% in terms of relative %) can substantially be a standard. (Alternatively, the range of $\pm 0.1$ EV or less is of course further preferable.)

As described above, when the intersection of the property curve agrees with a measurement point of "sensitivity", the sensitivity in the measurement and display can be kept to be unchanged. When only this viewpoint is noted, it is not essential to match the sensitivity target value with this point.

That is, when the exposure control target value deviates from the property intersection, the output level fluctuates, but the "sensitivity" at least in the measurement and display is kept to be constant regardless of the fluctuation. It can be said that this produces an effect different from/independent of "the setting of the output level by measurement of the exposure target value".

Moreover, when the action of keeping the output level to be constant is noted, the exposure control target value is set in the vicinity of the property intersection. Then, if the setting has a slight deviation, the output level fluctuation is small in the vicinity of the intersection, and can be in a substantially negligible range.

Furthermore, when the property intersection is set to the sensitivity measurement reference point, and the exposure target value further agrees with the intersection as in the aforementioned embodiment, the unchanged sensitivity is fully and remarkably effectively compatible with the unchanged output level.

Additionally, the present invention is not limited to the aforementioned embodiment. In the embodiment, the digital camera has an automatic exposure function, but this is not limited, and a camera having a manual exposure may be used. In this case, the photographic subject exposure amount and output level for the common intersection of a plurality of property curves are presented to a camera user (photographer) as a "recommended average exposure amount" and "recommended average exposure level". Then, the photographer can use, for example, a single-unit photometer, or an outer strobe with an independent dimmer function attached thereto to perform satisfactory photography. In this case, it is effectively unnecessary to change the setting of the photometer or the strobe by the gradation property.

Moreover, the use of the progressive CCD image pickup device has been described in the embodiment, but a signal reading system is not limited to this, and an interlace type device may be used. Furthermore, various solid image pickup devices other than CCD may be used. Furthermore, the present invention is not necessarily limited to the digital camera, and can be applied to a movie camera. Additionally, the present invention can variously be modified and implemented in a range which does not depart from the scope of the present invention.

In the aforementioned embodiment, the sensitivity of CCD 105 shown in FIG. 1 can be enhanced and the output of the image signal from the CCD 105 can be increased in an addition photography mode in order to increase the input digital value shown in FIG. 1.

In addition, in respect of utilizing pixel signals from the CCD 105, there is known a technique of so called "addition of pixel", in which pixel signals output from the adjacent pixels are added to improve a sensitivity or SN ratio of CCD 105. This technique can be applied, as "addition photographing mode" to the above embodiment so that the sensitivity of the CCD 105 is improved. Thus, if the "addition photographing mode" can be set in the digital camera described above, a level of the image signal from the CCD 105 can be increased, which corresponds to the input digital value shown in FIGS. 2 and 3.

Setting of the addition photography mode will be described with reference to FIGS. 1, 6 and 7. Additionally, the addition mode is set with the mode setting switch 113A shown in FIG. 1.

Figure 6:
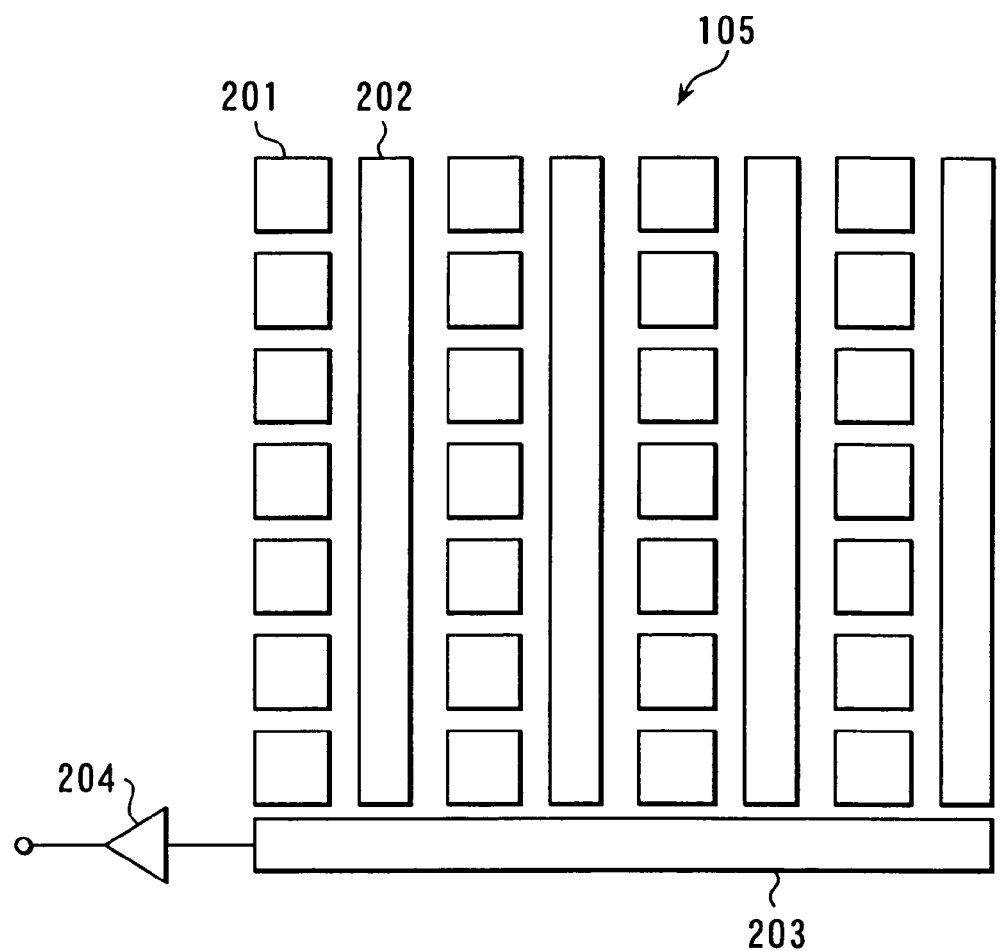
FIG. 6 is a plan view schematically showing a basic structure of a CCD image pickup device shown in FIG. 1.

In the CCD 105 shown in FIG. 1, as shown in FIG. 6, an interline (IT) type progressive (successive scanning) driving system is used which is constituted of photodiodes 201 arranged in a matrix, a plurality of vertical line CCDs 202, one horizontal line CCD 203, and an output amplifier 204. Here, in order to simplify the description, it is assumed that the CCD 105 is a monochromatic device.

Figure 7:
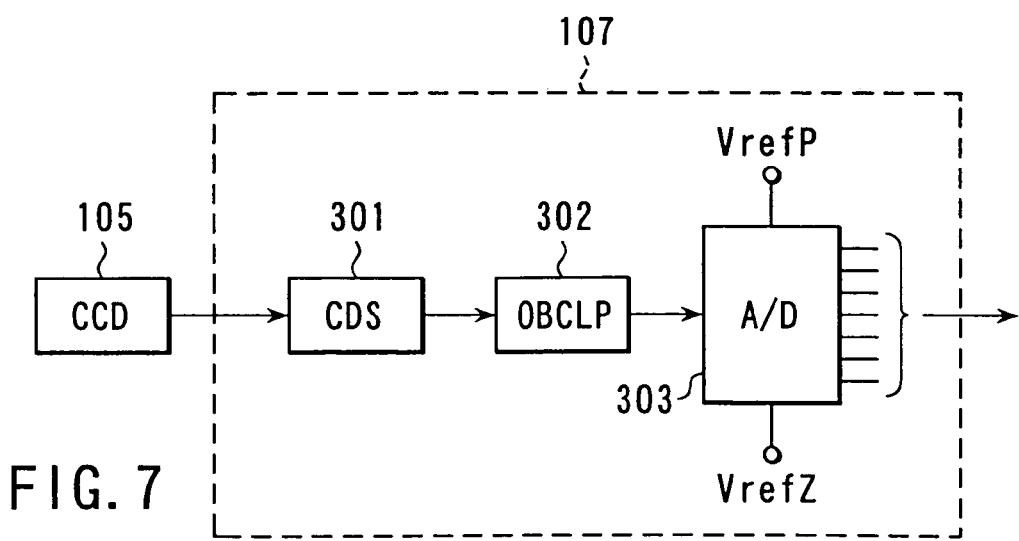
FIG. 7 is a block diagram schematically showing a preprocessing circuit shown in FIG. 1.

Moreover, as shown in FIG. 7, the image signal outputted from the image pickup device 105 and inputted to the preprocessing circuit 107 is inputted to a correlated double sampling circuit (CDS circuit) 301 in order to obtain a difference between a reset level and a signal level. In the correlated double sampling circuit (CDS circuit) 301, a reset noise is removed from the image signal and the signal is inputted to an OB clamp circuit (OBCLP circuit) 302. In the OB clamp circuit (OBCLP circuit) 302, a part of the image signal is clamped based on the signal (OB standard level) from an optical black (OB) pixel. The image signal outputted from the OB clamp circuit (OBCLP circuit) 302 is inputted to an A/D converter 303. Moreover, the image signal is converted to a digital signal in a predetermined sampling frequency for driving the CCD in the A/D converter 303.

Here, in the A/D converter 303, a minimum input level (input 0 reference) is equal to a reference voltage VrefZ on a − side and 0V, a maximum input level (i.e., maximum quantized level) is equal to a reference voltage VrefP on a + side, and this reference voltage VrefP can be varied. When the reference voltage VrefP is changed, the maximum quantized level can be varied. Therefore, for example, when VrefP is doubled, the maximum quantized level is doubled. Additionally, the maximum input level does not have to be equal to the reference voltage VrefP. The circuit including the A/D converter 303 may be constituted such that the maximum quantized level can be varied by changing the reference voltage VrefP.

The photography mode includes a usual photography mode and addition photography mode set with the mode setting switch 113A. The mode setting switch 113A can change the mode to the addition photography mode from the usual photography mode or vice versa. In the addition photography mode, the system controller 112 sets the CCD driver 106 to the driving system for the addition photography mode, and the CCD driver 106 drives the CCD 105 so that the CCD 105 adds a plurality of image signals in the device and reads the signal as follows.

(1) A VCCD driving pulse for n pixels (n transfer units) is outputted in each horizontal blanking period. Concretely, n=2 is set, and two pixels of a vertical direction are added in a horizontal transfer path.

(2) During horizontal transfer, m pixels are added by a diffusion section of a floating diffusion amplifier (FDA) disposed in an output section of the horizontal transfer path by m pixels addition driving. That is, after each reset pulse is applied, an HCCD driving pulse for m pixels (m transfer units) is outputted during a charge transfer period. Concretely, m=2 is set, and vertically added two pixels, that is, four pixels of a pixel portion are added.

The horizontal vertical 2×2 pixels are added in the aforementioned method. Moreover, the exposure amount target value is controlled to be ½ of the value of the usual photography mode. Furthermore, a size of the reference voltage VrefP in the A/D converter 303 is set to be twice the size in the usual photography mode.

In this case, when four pixels are added with ½ of the exposure amount, twice the usual image signals (½×4=2) are outputted from the image pickup device. Here, since VrefP of the A/D converter 303 is set to be double the voltage of the usual mode, the image signal is A/D converted without being clipped (more accurately at the same clip level as the usual level) by the A/D converter 303. That is, even when four pixels are added, the added pixel signal can be prevented from being clipped by the A/D converter 303, and image quality deterioration can be prevented.

Moreover, the exposure amount is ½ (1/N) and the number of pixels to be added is 4 in the above description, but other arbitrary settings may be used. For example, when the exposure control target value is the same as the usual value (once), the signal level becomes fourfold, and VrefP is therefore set to be fourfold as compared with the usual photography mode. The relation is shown in the following Table 1.

TABLE 1

| Addition of 4 pixels | Exposure target level | VrefP |
| --- | --- | --- |
| N | 1 | 1 |
| Y | 1/2 | 2 |
| Y | 1 | 4 |

Moreover, the relation for the addition (addition of two pixels) only of the vertical direction may be set as shown in the following Table 2.

TABLE 2

| Addition of 2 pixels | Exposure target level | VrefP |
|---|---|---|
| N | 1 | 1 |
| Y | 1/2 | 1 |
| Y | 1 | 2 |

Also in the addition of two pixels only of the vertical direction, (digital) addition averaging operation of horizontal two pixels (digital) is performed in the beginning of a digital signal processing after the AD conversion, and the addition of four pixels can comprehensively be realized.

Here, any addition is regarded as the comprehensive four pixels addition. A difference between two types of imaging will supplementally be described for two exposure target levels (½ and 1) during the pixel addition in Table 1 or 2. The target level of ½ corresponds to the imaging with the enhanced double sensitivity while an SN and saturation level equal to those of a non-addition time are secured as described above. Moreover, the target level of 1 corresponds to the imaging with the enhanced double SN (6 dB) and at the same sensitivity and saturation levels as those of the non-addition time.

As described above, according to the present embodiment, the reference voltage VrefP in the A/D converter is varied in accordance with the number of added pixels in the addition photography mode, the quantized maximum level is variably set, and the pixels are added by the analog addition system. Even in this case, since the A/D input voltage exceeds the A/D quantized maximum voltage, a problem of clipped signal can be solved. Therefore, the image quality deterioration because of the clip in the A/D converter is prevented, while the photography with the enhanced sensitivity by the pixel information addition of the analog addition system can be realized.

Additionally, the present invention is not limited to the aforementioned embodiment. The CCD is used as the image pickup device in the embodiment, but the device is not limited to the CCD, and charge transfer devices (CTD) including BBD, CID, and the like can also be applied. Furthermore, the number of added pixels is not limited to four or two, and can appropriately be changed in accordance with the specification.

Moreover, "the quantized maximum level in the A/D converting means for quantizing the image signal read from the image pickup device" is referred to by noting a relative quantized level with respect to the image signal outputted from the image pickup device. Therefore, means for variably setting the level may be other than means for variably setting the reference voltage of the A/D converter according to the embodiment. Arbitrary means may be used, such as a constitution in which an amplifier or attenuator is disposed before the image signal outputted from the image pickup device is inputted to the A/D converter, and an amplification or attenuation factor is variably set.

Furthermore, an example of monochromatic imaging apparatus has been described in the embodiment, but the present invention can also be applied to a color imaging apparatus. Furthermore, needless to say, the present invention can be applied not only to the digital still camera but also to arbitrary imaging apparatuses including a movie camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus for photographing a photographic subject, comprising:
an image pickup device for receiving light rays transferred from the subject, a photographic subject image being formed on the image pickup device, and the image being converted to an original image signal;
designating means for designating one of first and second gradation modes;
converting means for converting the original image signal from said image pickup device to an output image signal in accordance with the designated mode, said output image signal having a first gradation in accordance with a first gradation curve when the first gradation mode is designated, and a second gradation in accordance with a second gradation curve when the second gradation mode is designated; and
adjusting means for adjusting a level of the original image signal inputted to said converting means in accordance with the designated mode, and maintaining an average level of the output image signal outputted from said converting means at a substantially constant level;
wherein said first and second gradation property curves intersect each other at a certain target signal value, and the target signal value substantially corresponds to the average output level of the output image signal.

2. The apparatus according to claim 1, wherein the intersection of said property curves is determined to correspond to 18 to 20% of a maximum signal level in a value on an input side of a gradation converting property.

3. The apparatus according to claim 1, wherein at least one of said first and second gradation property curves has a knee property in which a knee point is set in a region having a signal value larger than the signal value of the intersection of said property curves.

4. An imaging apparatus for photographing a photographic subject, comprising:
an image pickup device for receiving light rays transferred from the subject, a photographic subject image being formed on the image pickup device, and the image being converted to an original image signal;
designating means for designating one of first, second and third gradation modes; and
converting means for converting the original image signal from said image pickup device to an output image signal in accordance with the designated mode, said output image signal having a first gradation in accordance with a first gradation curve when the first gradation mode is designated, a second gradation in accordance with a second gradation curve when the second gradation mode is designated, and a third gradation in accordance with a third gradation curve when the third gradation mode is designated;
wherein said first, second and third gradation property curves intersect one another at a substantially same intersection point, which is determined to correspond to 18 to 20% of a maximum signal level in a value on an input side of a gradation converting property.

5. The apparatus according to claim 4, wherein at least one of said first, second, and third gradation property curves has a knee property in which a knee point is set in a region having a signal value larger than a signal value of the intersection point of said property curves.

6. An imaging method for photographing a photographic subject, comprising:

receiving light rays from the photographic subject, forming a photographic subject image, and converting the image to an original image signal;

designating one of a first gradation mode and a second gradation mode;

converting said original image signal to an output image signal in accordance with the designation of one mode, said output image signal having a first gradation in accordance with a first gradation curve when the first gradation mode is designated, and a second gradation in accordance with a second gradation curve when the second gradation mode is designated; and adjusting a level of the original image signal inputted to said converting in accordance with the designation of one mode, and maintaining an average level of the output image signal outputted from said converting at a substantially constant level;

wherein said first and second gradation property curves intersect each other at a certain target signal value, and the target signal value substantially corresponds to the average output level of the output image signal.

7. The imaging method according to claim 6, wherein the intersection of said property curves is determined to correspond to 18 to 20% of a maximum signal level in a value on an input side of a gradation converting property.

8. The imaging method according to claim 6, wherein at least one of said first and second gradation property curves has a knee property in which a knee point is set in a region having a signal value larger than the signal value of the intersection of said property curves.

9. An imaging method for photographing a photographic subject, comprising:

receiving light rays from the photographic subject, forming a photographic subject image, and converting the image to an original image signal;

designating one of a first, second and third gradation modes; and converting said original image signal to an output image signal in accordance with the designation of one mode, said output image signal having a first gradation in accordance with a first gradation curve when the first gradation mode is designated, a second gradation in accordance with a second gradation curve when the second gradation mode is designated, and a third gradation in accordance with a third gradation curve when the third gradation mode is designated;

wherein said first, second and third gradation property curves intersect one another at a substantially same intersection point, which is determined to correspond to 18 to 20% of a maximum signal level in a value on an input side of a gradation converting property.

10. The imaging method according to claim 9, wherein at least one of said first, second, and third gradation property curves has a knee property in which a knee point is set in a region having a signal value larger than a signal value of the intersection point of said property curves.

* * * * *